United States Patent
Kwon et al.

(10) Patent No.: US 6,572,939 B2
(45) Date of Patent: *Jun. 3, 2003

(54) LIQUID CRYSTAL DISPLAY DEVICE

(75) Inventors: Soon Bum Kwon, Kyungki-do (KR);
Kyeong Jin Kim, Kyungki-do (KR);
Young Seok Choi, Daejeon (KR);
Gerus Igor Iranovich, Kyyiv (KR);
Andrey Dyadyusha, Kyyiv (KR);
Yuriy A. Reznikov, Kyyiv (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/105,349

(22) Filed: Mar. 26, 2002

(65) Prior Publication Data

US 2002/0132064 A1 Sep. 19, 2002

Related U.S. Application Data

(63) Continuation of application No. 09/193,110, filed on Nov. 16, 1998, now Pat. No. 6,399,165.

(30) Foreign Application Priority Data

Nov. 21, 1997 (KR) ............................................. 97-61755
May 20, 1998 (KR) ............................................. 98-18189

(51) Int. Cl.$^7$ ....................... C09K 19/56; G02F 1/1337
(52) U.S. Cl. .................... 428/1.2; 428/1.26; 252/299.4; 349/124; 349/128; 349/130; 349/132; 349/135
(58) Field of Search .................. 428/1.2, 1.26; 252/299.4; 349/128, 129, 130, 132, 135, 124

(56) References Cited

U.S. PATENT DOCUMENTS

| 3,912,920 A | 10/1975 | Kubota | 240/9.5 |
|---|---|---|---|
| 4,963,448 A | 10/1990 | Ichimura et al. | 430/20 |
| 4,974,941 A | 12/1990 | Gibbons et al. | |
| 5,032,009 A | 7/1991 | Gibbons et al. | |
| 5,073,294 A | 12/1991 | Shannon et al. | |
| 5,296,321 A | 3/1994 | Kawanishi et al. | |
| 5,389,698 A | 2/1995 | Chigrinov et al. | |
| 5,447,662 A | 9/1995 | Herr et al. | |
| 5,453,862 A | 9/1995 | Toko et al. | |
| 5,464,669 A | 11/1995 | Kang et al. | |
| 5,479,282 A | 12/1995 | Toko et al. | |
| 5,538,823 A | 7/1996 | Park et al. | |
| 5,539,074 A | 7/1996 | Herr et al. | |
| 5,576,862 A | 11/1996 | Sugiyama et al. | |

(List continued on next page.)

FOREIGN PATENT DOCUMENTS

| DE | 44 20 585 | 12/1995 |
| DE | 19637923 | 5/1997 |
| DE | 197 03 682 A1 | 8/1997 |

(List continued on next page.)

OTHER PUBLICATIONS

Lim et al.; "Tilting of Liquid Crystal through Interaction with Methyl Orange Molecules Oriented by Circularly Polarized Light"; JP Journal of Applied Physics; vol. 35; Oct. 1996; pp. 1281–1283.

(List continued on next page.)

Primary Examiner—Shean C Wu
(74) Attorney, Agent, or Firm—McKenna Long & Aldridge LLP

(57) ABSTRACT

A liquid crystal display device comprises first and second substrates, an alignment layer including a pyranose polymer or a furanose polymer on at least one of the first and second substrates, and a liquid crystal layer between the first and second substrates. The liquid crystal display device is characterized by excellent thermostability, superior anchoring energy and uniform alignment of the liquid crystal achieved in a reduced treatment time without creating any flowing effect in the liquid crystal.

23 Claims, 2 Drawing Sheets

U.S. PATENT DOCUMENTS

| | | | |
|---|---|---|---|
| 5,578,351 A | 11/1996 | Shashidhar et al. | |
| 5,602,661 A | 2/1997 | Schadt et al. | |
| 5,604,615 A | 2/1997 | Iwagoe et al. | |
| 5,656,340 A * | 8/1997 | Ubukata et al. | 428/1.1 |
| 5,657,105 A | 8/1997 | McCartney | |
| 5,705,096 A | 1/1998 | Kano et al. | 252/299.4 |
| 5,712,696 A | 1/1998 | Toko et al. | |
| 5,764,326 A | 6/1998 | Hasegawa et al. | |
| 5,767,994 A | 6/1998 | Kang et al. | |
| 5,784,139 A | 7/1998 | Chigrinov et al. | |
| 5,786,041 A | 7/1998 | Takenaka et al. | 248/1 |
| 5,824,377 A | 10/1998 | Pirwitz et al. | 428/1.2 |
| 5,853,818 A | 12/1998 | Kwon et al. | |
| 5,856,430 A | 1/1999 | Gibbons et al. | 528/353 |
| 5,856,431 A | 1/1999 | Gibbons et al. | 528/353 |
| 5,859,682 A | 1/1999 | Kim et al. | |
| 5,880,803 A | 3/1999 | Tamai et al. | 349/156 |
| 5,882,238 A | 3/1999 | Kim et al. | |
| 5,889,571 A | 3/1999 | Kim et al. | 349/124 |
| 5,909,265 A | 6/1999 | Kim et al. | |
| 5,928,561 A | 7/1999 | Bryan-Brown et al. | 252/299.4 |
| 5,982,466 A | 11/1999 | Choi et al. | |
| 6,383,579 B1 * | 5/2002 | Park et al. | 428/1.6 |
| 6,399,165 B1 * | 6/2002 | Kwon et al. | 428/1.2 |
| 6,459,463 B2 * | 10/2002 | Kim et al. | 349/113 |

FOREIGN PATENT DOCUMENTS

| | | |
|---|---|---|
| EP | 0261712 | 3/1988 |
| EP | 0525478 | 7/1992 |
| EP | 0 525 473 | 2/1993 |
| EP | 0 525 478 | 2/1993 |
| EP | 0 549 283 A2 | 6/1993 |
| EP | 0 635 748 A1 | 1/1995 |
| EP | 0690334 | 1/1996 |
| EP | 0 708 354 | 4/1996 |
| EP | 0 611 786 | 7/1996 |
| EP | 0 742 471 | 11/1996 |
| EP | 0 750 212 | 12/1996 |
| EP | 0 788 012 A2 | 8/1997 |
| GB | 2 281 977 | 3/1995 |
| GB | 2 286 893 | 8/1995 |
| GB | 2 309 793 | 8/1997 |
| GB | 2 309 794 | 8/1997 |
| GB | 2 310 048 | 8/1997 |
| GB | 2 317 964 A | 4/1998 |
| GB | 2 319 093 | 5/1998 |
| JP | 64-60833 | 3/1989 |
| JP | 1-251344 | 10/1989 |
| JP | 1-251345 | 10/1989 |
| JP | 2-55330 | 2/1990 |
| JP | 2-298917 | 12/1990 |
| JP | 3-36527 | 2/1991 |
| JP | 3-120503 | 5/1991 |
| JP | 3-241311 | 10/1991 |
| JP | 04-7520 | 1/1992 |
| JP | 4-284421 | 10/1992 |
| JP | 4-350822 | 12/1992 |
| JP | 5-019208 | 1/1993 |
| JP | 5-34699 | 2/1993 |
| JP | 5-53513 | 3/1993 |
| JP | 5-232473 | 9/1993 |
| JP | 7-56173 | 3/1995 |
| JP | 7-261185 | 10/1995 |
| JP | 7-318861 | 12/1995 |
| JP | 7-318942 | 12/1995 |
| JP | 8-334790 | 1/1996 |
| JP | 9-211465 | 8/1997 |
| JP | 9-211468 | 8/1997 |
| JP | 9-265095 | 10/1997 |
| JP | 9-318946 | 12/1997 |
| JP | 10-090684 | 4/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| WO | 94/28458 | 12/1994 |
| WO | 95/18989 | 7/1995 |
| WO | 95/22075 | 8/1995 |
| WO | WO 95/34843 | 12/1995 |
| WO | 96/22561 | 7/1996 |
| WO | 99/08148 | 2/1999 |

OTHER PUBLICATIONS

Eugene Hecht; "*Optics*"; 1987; pp. 298–299.

Jenkins et al., "*Fundamentals of Optics*"; McGraw–Hill Book Company; Third Edition; 1957; pp. 492–493.

Lim, et al., "Tilting of Liquid Crystal through Interaction with Methyl Orange Molecules Oriented by Circularly Polarized Light," *Japanese Journal of Applied Physics*, pp. L1281–L1283, Oct. 1, 1996.

W. Gibbons, et al., *Surface–mediated alignment of nematic liquid crystals with polarized laser light*, Letters to Nature, vol. 351, May 2, 1991, pp. 49 & 50.

Martin Schadt, *Surface–Induced Parallel Alignment of Liquid Crystals by Linearly Polymerized Photopolymers*, Jpn. J. Appl. Phys. vol. 31 (1992), Part 1, No. 7, Jul. 1992.

Yasufumi Iimura, et al., *Alignment Control of a Liquid Crystal on a Photosensitive Polyvinylalcohol Film*, Jpn. Appln. Phys. vol. 32 (1993), Part 2, No. 1A/B, Jan. 15, 1993.

Kunihiro Ichimura, *Photocontrol of Liquid Crystal Alignment*, 1993.

T. Marushii, et al., *Photosensitive Orientants for Liquid Crystal Alignment*, Mol. Mat. 1993, vol. 3, pp. 161–168.

Y. Toko, et al., *TN–LCDs Fabricated by Non–Rubbing Showing Wide and Homogeneous Viewing Angular Characteristics and Excellent Voltage Holding Ratio*, SID 93 Digest, pp. 622–625.

P. Shannon, et al., *Patterned optical properties in photopolymerized surface–aligned liquid–crystal films*, Letters to Nature, vol. 368, Apr. 7, 1994, pp. 532 & 533.

Y. Imura, et al., *Inveited Address: Electro–Optic Characteristics of Amorphous and Super–Multidomain TN–LCDs Prepared by a Non–Rubbing Method*, SID 94 Digest, pp. 915–918.

M. Schadt, et al., *Photo–Generation of Linearly Polymerized Liquid Crystal Aligning Layers Comprising Novel, Integrated Optically Patterned Retarders and Color Filters*, Jpn. J. Appl. Phys. vol. 34 (1995), pp. 3240–3249, Part 1, No. 6A, Jun. 1995.

A. Lien, et al., *UV modification of surface pretilt of alignment layers of multidomain liquid crystal displays*, Appl. Phys. Lett. 62 (21), Nov. 20, 1995, pp. 3108–3111.

M. Hasegawa, *Nematic Homogeneous Photo Alignment by Polyimide Exposure to Linearly Polarized UV*, Journal of Photopolymer Science and Technology, vol. 8, No. 2, 1995, pp. 241–248.

M. schadt, *Investigation of the Mechanism of the Surface–Induced Alignment of Liquid Crystals by Linearly Polymerized Photopolymers*, SID 95 Digest, pp. 528–531.

J. West, et al., *Polarized UV–Exposed Polyimide Films for Liquid–Crystal Alignment*, SID 95 Digest, pp. 703–705.

T. Hashimoto, et al., *TN–LCD with Quartered Subpixels Using Polarized UV–Light–Irradiated Polymer Orientation Films*, SID 95 Digest, pp. 877–880.

T. Saitoh, et al., *A New Hybrid N–TB Mode LCD with Two Domain Pixels Fabricated Using a Photopolymer*, Asia Display 95, pp. 589–592.

A. Lien, *UV–Type Two–Domain Wide Viewing Angle TFT/LCD Panels*, Asia Display 95, pp. 593–596.

T. Yamamoto, *Liquid–Crystal Alignment by Slantwise Irradiation of Non–Polarized UV Light on a Polyimide Layer*, SID 96 Digest, pp. 642–645.

M. Schadt, et al., *Optical patterning of multi–domain liquid–crystal displays with wide viewing angles*, Letters to Nature, vol. 381, May 16, 1996.

J. Chen, *Model of liquid crystal alignment by exposure to linearly polarized ultraviolet light*, Physical Review E, vol. 54, No. 2, Aug. 1996, pp. 1599–1603.

H. Soh, et al., *The Realization of Wide Viewing Angle TFT–LCDs using Photo–Alignment Method*, Euro Display 96, pp. 579–582.

J. Chen, *Mechanism of Liquid–Crystal Alignment by Polyimide Exposure to Linearly Polarized UV Light*, SID 96 Digest, pp. 634–637.

K. Lee, et al., *Late–News Poster: Mechanism of UV Modification of LC Pretilt Angle and Its Application to Two–Domain TN–LCDs*, SID 96 Digest, pp. 638–641.

J. Kim, et al., *Late–News Poster: Photo–Alignment of Liquid Crystals Using a New Photopolymer*, SID 96 Digest, pp. 646–649.

Y. Saitoh, et al., *Stability of UV–Type Two–Domain Wide-Viewing–Angle TFT–LCD Panels*, SID 96 Digest, pp. 662–665.

D. Seo, et al., *Invited Address: Surface Alignment of Liquid Crystals in LCDs*, SID 93 Digest, pp. 954–956.

Y. Iimura, *Invited Paper: Prospects of the Photo–Alignment Technique for LCD fabrication*, SID 97 Digest, pp. 311–314.

R. Shashidhar, et al., *A New Non–Rubbing Technique for Liquid–Crystal Alignment*, SID 97 Digest, pp. 315–318.

M. Schadt, et al., *Invited Paper: Optical Patterning of Multidomain LCDs*, SID Digets, pp. 397–400.

K. Han, et al., *A Study on the Photo–Alignment of the Polymer–Containing Cinnamate Group Using a New Single UV–Exposure Method*, SID Digest, pp. 707–710.

F. Yamada, et al., *Late–News Poster: A New Photo–Alignment Scheme for LC–Cell Pretilt Control*, SID 97 Digest, pp. 715–718.

M. Nam, et al., *Wide–Viewing–Angle TFT–LCD with Photo–Aligned Four–Domain TN Mode*, SID 97 Digest, pp. 933–936.

Marush, et al. "Photosensitive Orientants for Liquid Crystal Alignment," Mol. Mat., 1993, vol. 3, pp. 161–168.

Schadt, et al. "Surface–Induced parallel Alignment of Liquid Crystals by Linearly Polymerized Photopolymers," Jpn. J. Appl. Phys. vol. 31 (1992) pp. 2155–2164.

Dyadyusha, et al. "Properties of NLC Films Planarly Oriented by the Anisotropic Surface without Microrelief," Institute of Physics. A. Sc. UkrSSR, Kiev.

* cited by examiner

LIQUID CRYSTAL DISPLAY DEVICE

This application is a continuation of application Ser. No. 09/193,110 filed Nov. 16, 1998 now Pat. No. 6,399,165, issued Jun. 4, 2002, which is hereby incorporated by reference as if fully set forth herein.

BACKGROUND OF THE INVENTION

1. Field of the Invention

The present invention relates to a liquid crystal display device, and more particularly to a liquid crystal display device having a photo-alignment layer.

2. Description of the Related Art

It is generally known that a liquid crystal consists of anisotropic molecules. The average direction of the long axes of liquid crystal molecules is called the director of the liquid crystal. The director distribution in a liquid crystal is determined by the anchoring energy on a substrate, and is characterized by a director corresponding to a minimum of the surface energy of the liquid crystal and the anchoring energy. The director is rearranged by an electric field generated during operation of a liquid crystal display device (LCD). An LCD comprises two opposed substrates having liquid crystal therebetween.

In general, to obtain uniform brightness and a high contrast ratio, it is necessary to align the liquid crystal molecules uniformly in the liquid crystal cell. Several techniques have been proposed using polymers to obtain single or mono-domain homogeneous alignment of liquid crystals. Particularly, it is known that polyimide or polysiloxane-based materials have high quality and good thermostability. The most common technique employed as an alignment method to obtain a mono-domain liquid crystal cell involves forming microgrooves on the surface of the alignment polymer, which provides strong anchoring and stable alignment. In the above-mentioned technique, known as the rubbing method, a substrate coated with an alignment polymer is rubbed with a cloth. The rubbing method is a rapid method which can be applied to large scale LCDs, and thus is widely used in the industry.

The rubbing method, however, has several serious drawbacks. Because the shape of the microgrooves formed on the alignment layer depends on the rubbing cloth and rubbing intensity, the resulting alignment of the liquid crystal is often heterogeneous, causing phase distortion and light scattering. Further, an electrostatic discharge (ESD) generated by rubbing of the polymer surface further generates dust contamination in an active matrix LCD panel, decreasing production yield and damaging the substrate.

In order to solve these problems, a photo-alignment method has been proposed using a polarized ultraviolet light irradiated onto a photosensitive polymer to photo-polymerize the polymer (A. Dyadyusha, V. Kozenkov et al., *Ukr. Fiz. Zhurn.*, 36 (1991) 1059 W. M. Gibbons et al., *Nature*, 351 (1991) 49 ; M. Schadt et al., *Jpn. J. Appl. Phys.*, 31 (1992) 2155 ; T. Ya. Marusii & Yu. A. Reznikov, *Mol. Mat.*, 3 (1993) 161 ; EP 0525478 ; and U.S. Pat. No. 5,538,823—a polyvinyl-fluoro cinnamate patent). The alignment capability of the photosensitive polymer is determined by the anisotropy of the photosensitive polymer, which is induced by ultraviolet light irradiation.

In the photo-alignment method, an alignment layer is given an alignment direction by irradiating a substrate coated with a photo-alignment material with a linearly polarized UV light. The photo-alignment layer comprises a polyvinyl cinnamate-based (PVCN) polymer, and as linearly polarized UV light is irradiated, the polymer photo-polymerizes through cross-linking. Cross-linking is generated among the polymers by the UV light energy.

In terms of the direction of the photo-polymers, the alignment direction of the photo-alignment layer has a specific direction in relation to the polymerization direction of the linearly polarized UV light. The alignment direction of the photo-alignment layer is determined by the direction of the photo-polymers. The pretilt angle of the photo-alignment layer is determined by the incident direction and the irradiating energy of the irradiated UV light. That is to say, the pretilt angle direction and the pretilt angle of the photo-alignment layer are determined by the polarized direction and the irradiating energy of the irradiated UV light.

With regard to photo-alignment, a polarizer is rotated in an arbitrary angle on each domain of the LCD. Then, in response to irradiating UV light, the polarization direction is changed, whereby a multi-domain LCD cell is achieved with multiple domains having different alignment directions in relation to each other.

The photo-alignment method, however, has several drawbacks. For example, it is impossible to apply on a wide scope. Most importantly, low photo-sensitivity of the photo-alignment material results in reduction of anisotropy and thermostability.

UV light irradiation takes a long time using conventional techniques, from approximately 5 to as long as 10 minutes. Low photo-sensitivity and small anisotropy make the anchoring energy of the final photo-alignment layer weak. Moreover, when the liquid crystal is injected into the LCD, it is required that the injection be made at a high temperature. Low thermostability induces a flowing effect on the substrates, which can be observed as a ripple pattern in the liquid crystal upon injection between the substrates. Finally, disclination owing to the uniform alignment of liquid crystals remains as a problem to be solved.

SUMMARY OF THE PREFERRED EMBODIMENTS

Accordingly, the present invention is directed to a LCD that substantially obviates one or more of the problems due to limitations and disadvantages of the related art.

An object of the present invention is to provide an LCD having good thermostability and photo-sensitivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the liquid crystal display device of the present invention comprises first and second substrates, an alignment layer including a pyranose or a furanose polymer on at least the first substrate, and a liquid crystal layer between the first and second substrates.

The liquid crystal display device of the present invention preferably comprises a second alignment layer on the second substrate. The second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A liquid crystal display device of the present invention will now be explained in detail in conjunction with the accompanying drawings.

According to an embodiment of the present invention, in order to enhance the sensitivity of a photo-alignment layer for a liquid crystal device and obtain thermostable anchoring of the liquid crystal, a cellulose cinnamate (CelCN) is used as the photo-alignment material. Several different forms of CelCN suitable for use in the present invention are obtained as derivatives of cellulose or cellulose acetate and cinnamoyl chloride having various substitution ratios.

Pyranose polymers and furanose polymers are particularly preferred for use as the cellulose cinnamates of the present invention.

Pyranose polymers suitable for use in the present invention are characterized by the following chemical formula:

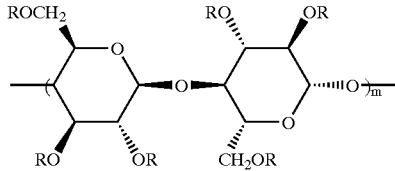

wherein m is 10 to 10,000;

R is at least one member selected from the group consisting of

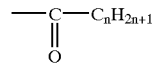

and

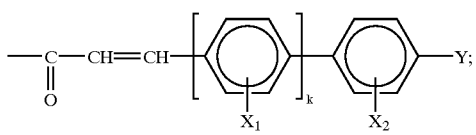

n is 1 to 10;

$X_1$ and $X_2$ are each selected from the group consisting of hydrogen, fluorine, chlorine, methyl and methoxy;

k is 0 to 1; and

Y is selected from the group consisting of hydrogen, fluorine, chlorine, cyano, trifluoromethyl, trifluoromethoxy, $C_{n'}H_{2n'+1}$ and $OC_{n'}H_{2n'+1}$, wherein n' is 1 to 10.

In a particularly preferred form of the invention, the alignment layer is characterized by 0 to 2

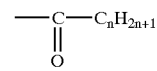

constituents per glucopyranose ring, wherein n is 1 to 10.

As is well-known in the art, the four possible glucopyranose conformations and the four possible galactopyranose conformations, each of which conformations is within the scope of the terms cellulose and cellulose acetate as used in the present invention, are illustrated by the following formulas:

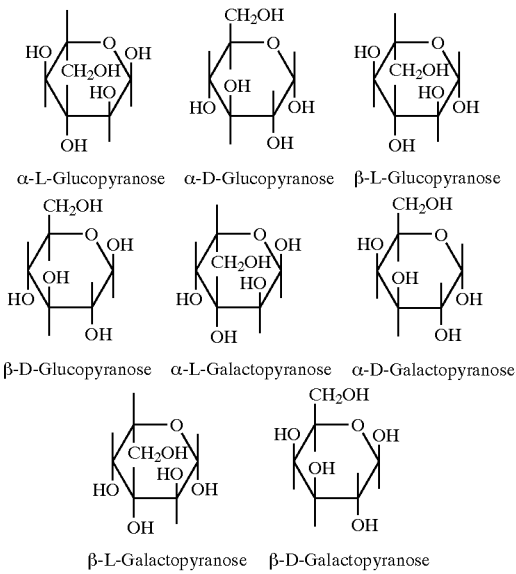

Figure 1:
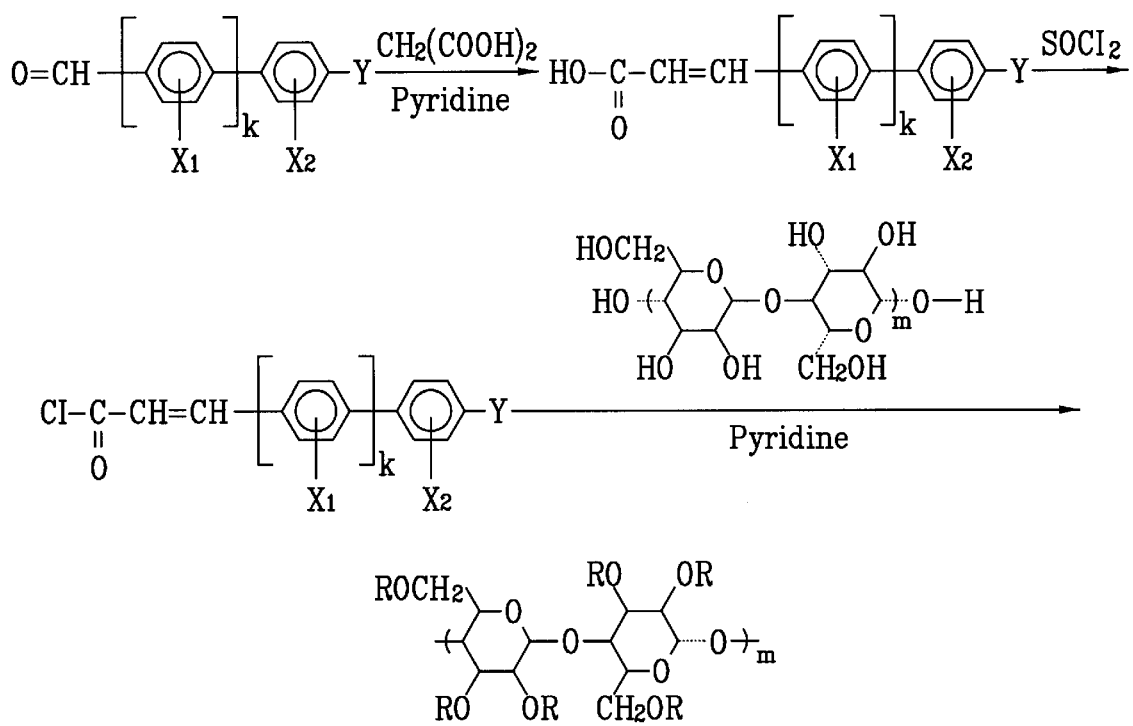
FIG. 1 illustrates the synthesis of a cellulose cinnamate according to an embodiment of the present invention.

FIG. 1 shows the synthesis of a cellulose cinnamate according to an embodiment of the present invention. A cinnamic acid is first prepared by reacting a benzaldehyde with malonic acid in pyridine and piperidine. The cinnamic acid is then reacted with thionyl chloride to produce a cinnamoyl chloride derivative. The CelCN is finally synthesized by reacting cellulose, or cellulose acetate, with the cinnamoyl chloride derivative in an inert solvent (such as chloroform, nitrobenzene, chlorobenzene, or the like). The reaction mixture is diluted with methanol, filtered, dried in a vacuum, and milled by a vibrating mill, whereupon the CelCN is obtained.

A process of forming an alignment layer according to an embodiment of the present invention comprises the following three steps.

First, a polymer solution is prepared using chloroform ($CHCl_3$) as a solvent. The concentration of the polymer determines the ultimate thickness of the alignment layer on the LCD substrates. To form a film having a thickness of approximately 1 $\mu$m, a CelCN solution of 10 g/l is selected for coating the substrate.

Second, a drop of the CelCN solution is placed in the center of the substrate using a measuring pipette, followed by spin-coating while centrifuging at a rotation speed of 3000 rpm for 30 seconds. The produced film is immediately prebaked at 180° C. for 1 hour.

Third, the initially isotropic polymer film is irradiated with polarized UV light having a wavelength $\lambda$ below 365 nm to render it anisotropic, with either a positive or a negative dielectric. The irradiation time is more than 5 seconds, and the intensity of UV light is about 5 $mW/cm^2$.

Figure 2:
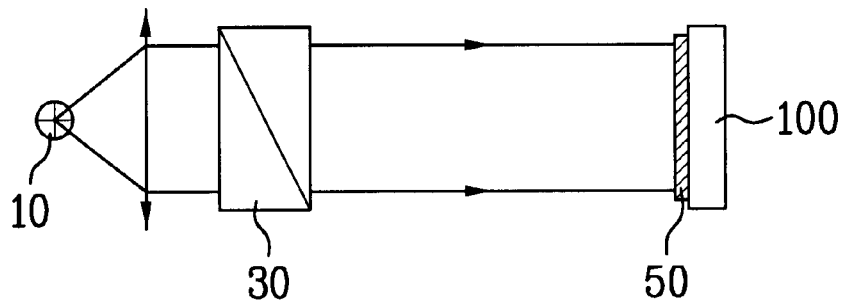
FIG. 2 schematically illustrates an embodiment of a system of light irradiation of a photo-alignment layer in accordance with the present invention.

FIG. 2 illustrates a scheme of light irradiation of a photo-alignment layer of the present invention.

As shown in FIG. 2, an embodiment of the light irradiating procedure utilizes a substrate 100, a photo-alignment layer 50 including a CelCN on substrate 100, a lamp 10 for irradiating UV light over photo-alignment layer 50, and a polarizer 30 for polarizing the light irradiated from lamp 10.

Lamp 10 is a Halogen (Hg) lamp. Light having an average power of 500 W is transmitted from a lens of the halogen lamp, polarized by polarizer 30, and irradiated onto photo-alignment layer 50 at a power of 5 $mW/cm^2$ for about 0.5 to about 180 seconds, more preferably about 0.5 to about 60 seconds, and most preferably about 3 to about 60 seconds.

The alignment obtained from the CelCN polymers of the present invention has a stronger anchoring energy compared with the alignment obtained from conventional photo-alignment materials. The values of the anchoring energy of CelCN versus typical prior art photo-alignment materials, including polyvinyl fluorocinnamate (PVCN-F) and polysiloxane cinnamate (PSCN), have been measured. The results are shown in the following TABLE 1:

TABLE 1

| Material | Irradiation Time (seconds) | Anchoring Energy ($erg/cm^2$) |
|---|---|---|
| cellulose 4-fluorocinnamate | 5 | greater than $10^{-2}$ |
| cellulose 4-fluorocinnamate | 300 | greater than $10^{-2}$ |
| polyvinyl-fluorocinnamate | 5 | $3 \times 10^{-4}$ |
| polyvinyl-fluorocinnamate | 300 | $10^{-2}$ |
| polysiloxane-cinnamate | 5 | bad alignment; measuring failure |
| polysiloxane-cinnamate | 300 | $5 \times 10^{-3}$ |

To estimate the thermostability of the CelCN, the quality of the alignment layer was checked using an electro-optical technique. Electro-optical response, in terms of cell transparency ratio between crossed and parallel polarizers, anchoring energy and surface density of the alignment layer were each measured in a twisted nematic (TN) cell containing samples of the CelCN layers. The cell was heated to about 120° C. and kept at this temperature for 4 hours. After cooling the samples to room temperature, it was revealed that the performance characteristics were maintained unchangeably.

Among its other advantages, the present invention thus significantly reduces UV irradiation time. Whereas prior art photo-alignment techniques involved UV irradiation for anywhere from 5 to 10 minutes, the present invention provides a method which successfully achieves photo-alignment using UV irradiation in anywhere from about 0.5 seconds to one minute.

Preferred embodiments of the present invention will now be described in further detail. It should be understood that these examples are intended to be illustrative only and that the present invention is not limited to the conditions, materials or devices recited therein.

EXAMPLE 1

Synthesis of 4-fluorocinnamic Acid

A mixture of 0.1 mol 4-fluorobenzaldehyde, 0.15 mol malonic acid, and 0.1 ml piperidine in 30 ml pyridine is boiled for 10 hours, cooled, and treated with 150 ml HCl having a 10% concentration. The precipitate is filtered and crystallized with ethanol. The yield of 4-fluorocinnamic acid is 68% and the melting point is 211° C.

The following compounds are synthesized in a similar manner:

2-fluoro cinnamic acid;
3-fluoro cinnamic acid;
3-chloro cinnamic acid;
4-chloro cinnamic acid;
2-methyl cinnamic acid;
4-phenyl cinnamic acid;
4-methoxy cinnamic acid;
4-pentoxy cinnamic acid;
4-heptyloxy cinnamic acid;
4-nonyloxy cinnamic acid;
4-(4-pentoxyphenyl)cinnamic acid;
4-trifluoromethoxy cinnamic acid;
4-trifluoromethyl cinnamic acid;
4-pentyl cinnamic acid; and
4-methoxy-3-fluorocinnamic acid.

EXAMPLE 2

Synthesis of Cellulose Cinnamate

A mixture of 0.05 mol cinnamoyl chloride (prepared from a cinnamic acid produced in Example 1, an excess of thionyl chloride, and catalytic quantities of dimethyl formamide), 0.01 mol cellulose, and 0.04 mol pyridine in 20 ml nitrobenzene is heated for 24 hours at 120° C., cooled, and diluted with methanol. The reaction product is filtered, washed with methanol and water, dried in a vacuum, and subsequently milled by a vibrating mill.

Pyranose polymers are produced in the above manner using each of the cinnamic acids produced in Example 1. The yield of cellulose cinnamate is approximately 65% to 92%. Thin layer chromatography (TLC) reveals there is no cinnamic acid in the reaction products.

EXAMPLE 3

Synthesis of Cellulose Acetate Cinnamate

A mixture of 0.03 mol cinnamoyl chloride (prepared from a cinnamic acid produced in Example 1, an excess of thionyl chloride, and catalytic quantities of dimethyl formamide), 0.01 mol cellulose acetate, and 0.03 mol pyridine in 20 ml chloroform is boiled for 24 hours, cooled, and diluted with methanol. The reaction product is filtered, washed with methanol and water, dried in a vacuum, and subsequently milled by a vibrating mill.

Pyranose acetate polymers are produced in the above manner using each of the cinnamic acids produced in Example 1. The yield of cellulose acetate cinnamate is approximately 65% to 92%. Thin layer chromatography (TLC) confirms there is no cinnamic acid in the reaction products.

Figure 3:
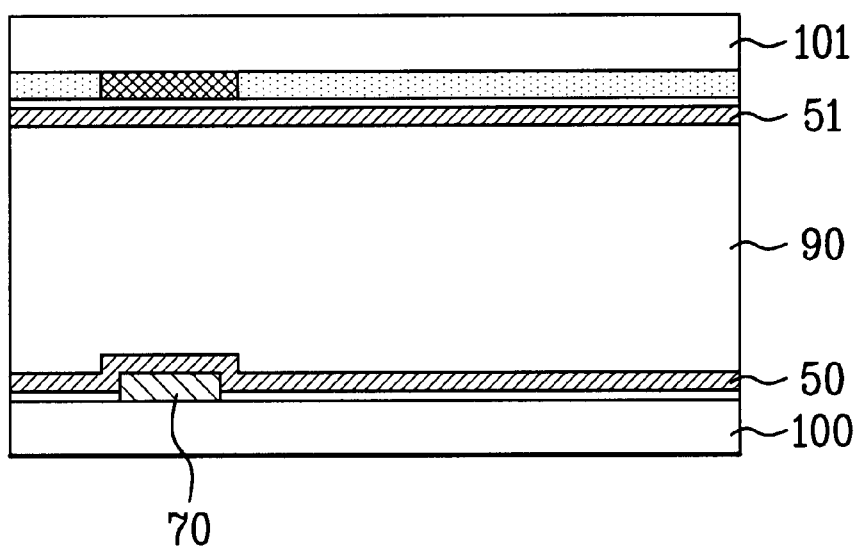
FIG. 3 is a sectional view of an embodiment of a liquid crystal display device according to the present invention.

FIG. 3 is a sectional view of an embodiment of a liquid crystal display device of the present invention.

As shown in FIG. 3, the LCD comprises first and second substrates 100 and 101, respectively, a thin film transistor (TFT) 70 on first substrate 100, a first alignment layer 50 formed entirely over TFT 70 and first substrate 100, a second alignment layer 51 formed on second substrate 101, and a liquid crystal layer 90 injected between first and second substrates 100 and 101.

First and/or second alignment layers 50, 51 include a pyranose or furanose polymer, for example the CelCN shown in FIG. 1. The CelCN provides good uniform alignment in a short irradiation time. For example, irradiation for as little as 0.5 seconds gives a stable alignment.

The pyranose and furanose polymers preferably comprise both photo-sensitive constituents and non-photo-sensitive constituents which are composited in a specific ratio. The pyranose and furanose polymers can be composited with only one constituent from each of photo-sensitive and non-photo-sensitive constituents, or one or more different photo-sensitive and/or non-photo-sensitive constituents.

Suitable photo-sensitive constituents for use in the pyranose and furanose polymers of the present invention include an array of cinnamoyl derivatives, which can include substituents such as hydrogen, fluorine, chlorine, cyano, trifluoromethyl, trifluoromethoxy, $C_{n'}H_{2n'+1}$, $OC_{n'}H_{2n'+1}$, phenyl and $C_6H_4OC_{n'}H_{2n'+1}$, wherein n' is 1 to 10.

Suitable non-photo-sensitive constituents for use in the pyranose and furanose polymers of the present invention include various ester derivatives, such as

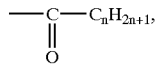

wherein n is 1 to 10.

When UV light is irradiated onto the first and/or second alignment layers at least once, the alignment angle, the alignment direction thereof, the pretilt angle and the pretilt angle direction thereof are determined and alignment stability of the liquid crystal is achieved.

As the light used in the photo-alignment method, light in the UV range is preferable. It is not advantageous to use unpolarized light, linearly polarized light, or partially polarized light.

Moreover, it is contemplated as within the scope of the present invention that only one substrate of the first and second substrates be photo-aligned using the above-described method while the other substrate is not so treated. If both substrates are photo-aligned, it is within the scope of the invention that the other substrate be treated with polyamide or polyimide as the alignment material and that the alignment be accomplished by prior art rubbing methods. It is also possible to use a photo-sensitive material such as polyvinyl cinnamate (PVCN) or polysiloxane cinnamate (PSCN) as the alignment material for the other substrate and accomplish the alignment using photo-alignment methods.

As to the nature of liquid crystal layer 90, it is possible to align the long axes of the liquid crystal molecules parallel with the first and second substrates to produce a homogeneous alignment. It is also possible to align the long axes of the liquid crystal molecules perpendicular to the first and second substrates to achieve a homeotropic alignment. Moreover, it is possible to align the long axes of the liquid crystal molecules with a specific predetermined angle in relation to the substrates, with a tilted alignment in relation to the substrates, with a twisted alignment in relation to the substrates, or in an alignment parallel to one substrate and perpendicular to the other substrate to provide a hybrid homogeneous-homeotropic alignment. It is thus essentially within the scope of the present invention to apply any mode of alignment of the liquid crystal molecules in relation to the substrates as may be desired, such choices being apparent to one of ordinary skill in the art.

According to the present invention, the first and/or second alignment layers can be divided into two or more domains by creating different directional alignments of the liquid crystal molecules on each domain in relation to the direction of the substrates. Accordingly, a multi-domain LCD such as a 2-domain LCD, a 4-domain LCD, and so on can be obtained, wherein the liquid crystal molecules in each domain are driven differently.

An LCD made in accordance with the present invention is characterized by excellent thermostability. It is chus possible to inject the liquid crystal into the liquid crystal device at room temperature while preventing and avoiding any flowing effect from generating, as occurs in conventional techniques. Furthermore, the photo-alignment layer of the present invention possesses excellent photosensitivity, adhesion, and strong anchoring energy. As a result, it is possible to align the liquid crystal effectively and increase alignment stability of the liquid crystal.

It will be apparent to those skilled in the art that various modifications and variations can be made in the liquid crystal display device of the present invention without departing from the spirit or scope of the invention. Thus, it is intended that present invention cover the modifications and variations of this invention provided they come within the scope of the appended claims and their equivalents.

What is claimed is:

1. A liquid crystal display device comprising:
    first and second substrates;
    a first alignment layer on the first substrate;
    a liquid crystal layer between the first and second substrates;
    wherein the alignment layer film includes cellulose cinnamate (CelCN) polymers that includes a photosensitive constituent.

2. The liquid crystal display device of claim 1, wherein the cellulose cinnamate polymers are derived from the group consisting of cellulose, cellulose acetate, and cinnamoyl chloride.

3. The liquid crystal display device of claim 2, wherein the cellulose cinnamate polymers are selected from a group consisting of pyranose polymers and furanose polymers.

4. The liquid crystal display device of claim 3, wherein the pyranose polymers are characterized by the following chemical formula:

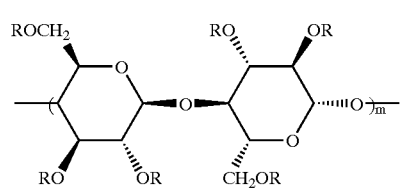

wherein m is 10 to 10,000;

R is at least one member selected from the group consisting of

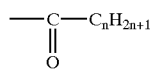

and

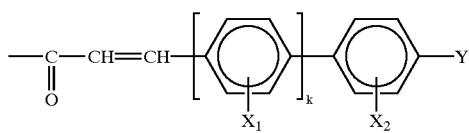

n is 1 to 10;

$X_1$ and $X_2$ are each selected from the group consisting of hydrogen, fluorine, chlorine, methyl and methoxy;

k is 0 to 1; and

Y is selected from the group consisting of hydrogen, fluorine, chlorine, cyano, trifluoromethyl, triflouromethoxy, $C_{n'}H_{2n'+1}$ and $OC_{n'}H_{2n'+1}$, wherein n' is 1 to 10.

5. The liquid crystal display device of claim 3, wherein the pyranose polymers include a photo-sensitive constituent and non-photo-sensitive constituent.

6. The liquid crystal display device of claim 5, wherein the photo-sensitive constituents include cinnamoyl derivatives.

7. The liquid crystal display device of claim 6, wherein the cinnamoyl derivatives include substituents selected from the group consisting of hydrogen, fluorine, chlorine, cyano, trifluoromethyl, trifluoromethoxy, $C_{n'}H_{2n'+1}$, $OC_{n'}H_{2n'+1}$, phenyl, and $C_6H_4OC_{n'}H_{2n'+1}$, wherein n' is 1 to 10.

8. The liquid crystal display device of claim 5, wherein the non-photo sensitive constituents includes ester derivatives.

9. The liquid crystal display device of claim 1, further comprising a second alignment layer including a material selected from the group consisting of pyranose polymer, furanose polymer, polyvinyl cinnamate, polysiloxane cinnamate, polyvinyl alcohol, polyamide, polyimide, polyamic acid, and silicon dioxide.

10. The liquid crystal display device of claim 3, wherein the furanose polymers includes a photo-sensitive constituent and non-photo-sensitive constituent.

11. The liquid crystal display device of claim 8, wherein the ester derivatives are characterized by the following chemical formula:

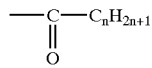

wherein n is 1 to 10.

12. The liquid crystal display device of claim 1, wherein the alignment layer includes constituents characterized by the following pyranose polymer:

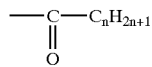

constituents per glucopyranose ring, wherein n is 1 to 10.

13. The liquid crystal display device of claim 12, wherein the alignment layer further at least one constituents selected from the group consisting of four possible glucopyranose conformations and four possible galactopyranose conformations characterized by the following chemical formulas:

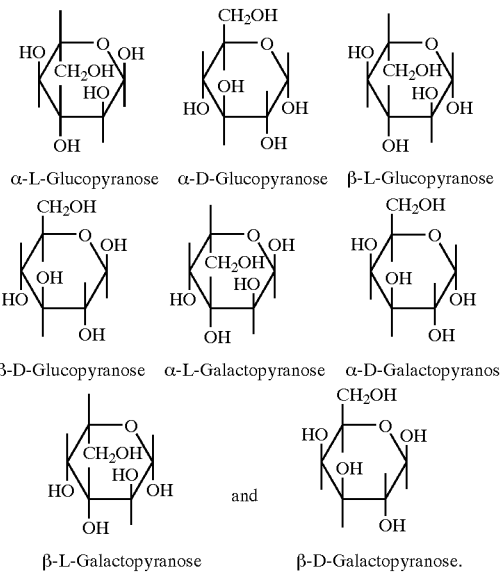

14. The liquid crystal display device of claim 1, wherein the cellulose cinnamate (CelCN) polymers has an anchoring energy of greater than about $1 \times 10^{-2}$ erg/cm$^2$.

15. The liquid crystal display device according to claim 1, wherein the liquid crystal in the liquid crystal layer has a positive dielectric anisotropy.

16. The liquid crystal display device according to claim 1, wherein the liquid crystal in the liquid crystal layer has a negative dielectric anisotropy.

17. The liquid crystal display device according to claim 1, wherein the alignment layer is divided into at least two domains, for driving liquid crystal molecules in the liquid crystal layer differently on each domain.

18. The liquid crystal display device according to claim 1, wherein liquid crystal molecules in the liquid crystal layer align homogeneously in relation to at least one of the first and second substrates.

19. The liquid crystal display device according to claim 1, wherein liquid crystal molecules in the liquid crystal layer align homeotropically in relation to at least one of the first and second substrates.

20. The liquid crystal display device according to claim 1, wherein liquid crystal molecules in the liquid crystal layer are arranged in tilted alignment in relation to at least one of the first and second substrates.

21. The liquid crystal display device according to claim 1, wherein liquid crystal molecules in the liquid crystal layer are arranged in twisted alignment in relation to at least one of the first and second substrates.

22. The liquid crystal display device according to claim 1, wherein liquid crystal molecules in the liquid crystal layer align homogeneously in relation to one substrate of the first and second substrates and align homeotropically in relation to another substrate of the first and second substrates.

23. The liquid crystal display device of claim 1, further comprising a second alignment layer on the second substrate.

* * * * *

UNITED STATES PATENT AND TRADEMARK OFFICE
CERTIFICATE OF CORRECTION

PATENT NO.     : 6,572,939 B2
DATED          : June 3, 2003
INVENTOR(S)    : Soon-Bum Kwon et al.

It is certified that error appears in the above-identified patent and that said Letters Patent is hereby corrected as shown below:

<u>Title page,</u>
Item [75], Inventors, please correct the last three inventors address as follows:

-- Gerus Igor Iranovich, Kyyiv (Ukraine)
   Andrey Dyadyusha, Kyyiv (Ukraine)
   Yuriy A. Reznikov, Kyyiv (Ukraine) --

Signed and Sealed this

Ninth Day of December, 2003

JAMES E. ROGAN
*Director of the United States Patent and Trademark Office*